Jan. 9, 1945. M. H. MARTIN 2,366,922

TRUCK

Filed Jan. 19, 1943 2 Sheets-Sheet 1

Inventor:
Mark H. Martin
By John Darley
Attorney

Jan. 9, 1945.   M. H. MARTIN   2,366,922
TRUCK
Filed Jan. 19, 1943   2 Sheets-Sheet 2
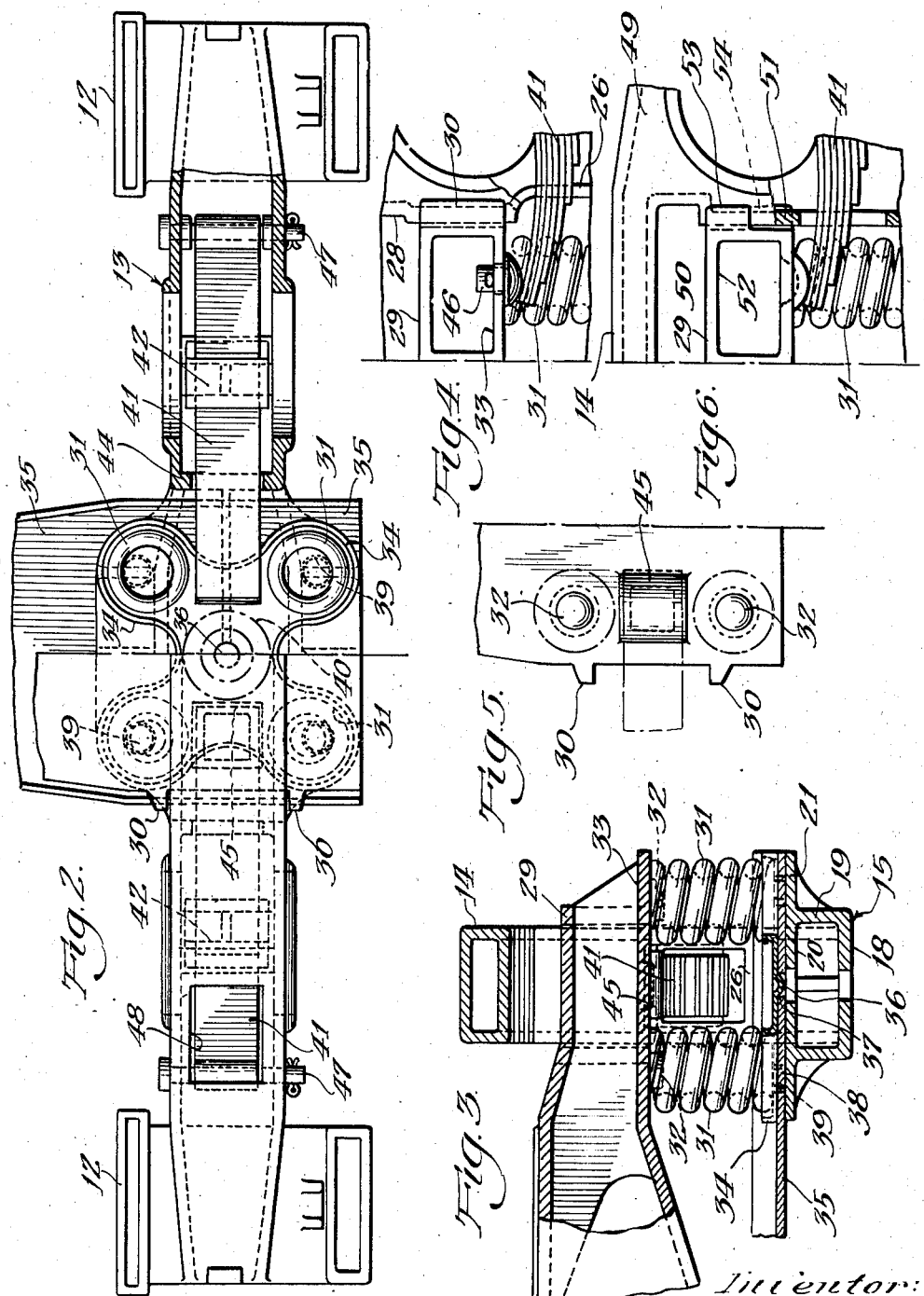

Patented Jan. 9, 1945

2,366,922

UNITED STATES PATENT OFFICE 2,366,922

TRUCK

Mark H. Martin, Reading, Pa., assignor to Birdsboro Steel Foundry and Machine Company, Birdsboro, Pa., a corporation of Pennsylvania Application January 19, 1943, Serial No. 472,853

29 Claims. (Cl. 105—197.1)

My invention relates to railway car trucks of the freight car type and, in particular, a truck characterized by good riding qualities and capacity for high speed service.

Modern freight car truck design recognizes the disadvantages inherent in the simple coil spring suspension now commonly interposed in the window opening of the truss type side frame. Owing to track or wheel irregularities and the shocks imparted to the truck by out of surface rail joints, such spring groups tend to oscillate and set up a pendulum roll of the car body at some operating speed of the car, dependent upon the nature of the lading and the type of body. Synchronization of the natural period of the springs with the frequency of shocks transmitted to the truck by the rails and joints may increase the amplitude of the roll sufficiently to cause derailment on curves or to drive the springs solid with accompanying uncushioned shocks on the rails and possible failure of the springs. Various types of lading, such as fruit and live stock, are damaged by this action.

A characteristic design for solving the above problem may include groupings of different types of springs such as coil or freely acting springs and energy absorptive springs, such as plate or leaf springs, which have a mutually dampening action when subjected to a common load and all of which are arranged in the window opening of a side frame. A primary objection to this design is that the entire bolster load is concentrated on the central portion of the frame tension member.

It is therefore one object of my invention to provide a truck having truss type side frames and non-synchronous, spring groupings which are arranged to insure a better distribution of the bolster load to the side frames than is characteristic of previous designs and to achieve an accompanying economy of metal in the side frames and low average maximum fibre stresses.

A further object is to devise a truck of the character indicated in which a portion of the bolster load is distributed to the diagonal tension members of the side frame through leaf springs so that these members act as spring load carrying elements in addition to transmitting that portion of the bolster load which is distributed to the central part of the side frames through the coil springs.

A further object is to provide a truck having a non-synchronous spring assembly wherein the parts are so related that the springs may be assembled before connecting the bolster to the side frames, or the bolster removed for replacement or wheel change without disturbing the spring assembly.

These and further objects of my invention will be set forth in the following specification, reference being had to the accompanying drawings, and the novel means by which said objects are effectuated will be definitely pointed out in the claims.

In the drawings:

Fig. 1 is a side elevation of my improved truck, partly in section.

Fig. 2 is a plan view, also partly in section, taken along the line 2—2 in Fig. 1.

Fig. 3 is a section along the line 3—3 in Fig. 1.

Fig. 4 is a fragmentary view showing an alternate spring seat construction on the bolster for bearing on one end of the leaf spring.

Fig. 5 is a fragmentary view of the underside of one end of the bolster, as viewed in the direction of the arrow 5 in Fig. 1.

Fig. 6 shows a modified connection between the bolster and side frame which differs from the standard construction shown in Fig. 1 in that the bolster is raised for disconnection from the frame so that it is unnecessary to disturb the spring assembly.

Referring to Figs. 1 to 4, inclusive, my improved truck is equipped with the usual wheels 10 and journals 11 which are received within journal boxes 12 having the conventional brasses and wedges (not shown). The boxes are located at the ends of and may be formed integrally with a side frame 13 comprising a compression member 14 and a tension member 15 composed of a central spring seat portion 16 and diagonal tension members 17 which connect the portion and journal boxes.

The portion 16 (see Fig. 3) is of box section and comprises a bottom web 18, side walls 19 and top web 20 which is extended laterally to form shelves 21 and thus create a spring seat 22 of extended area. The web 18 extends to the journal boxes 12 to form the bottom webs 23 of the diagonal tension members while the side walls 19 are also extended beyond the ends of the seat 22 to form side walls 24 which connect the webs 23 with the top webs 25 of the compression member 14. At the spring seat 22 and bridged between the walls 24, webs 26 extend upwardly and define therebetween a lower bolster opening 27. Above this opening, the webs 26 extend upwardly to form bolster guides 28 and slidable between these guides is one end of a bolster 29 which may be of box section and from whose opposite sides project guide lugs 30 which engage the walls 24 and limit endwise movement of the bolster.

The bolster is partially supported by a cluster of coil springs 31, four such springs being shown in the present instance although the number may be varied and arranged as an inner and an outer pair relative to the side frame. The upper ends of the springs are centered by lugs 32 depending from the lower web 33 of the bolster 29, while the lower ends rest on a spring plate 34 whose periphery may be flanged upwardly and conformed to the curvature of the springs. The plate 34 bears on a spring plank 35 of conventional channel shape and shifting of the plate is prevented by offsetting a portion 36 (see Fig. 3) into an aperture 37 in the plank and the plank is held in position by lugs 38 extending from the shelves 21 into apertures 39 in the plank. A possible variation to obtain increased spring capacity is indicated in Fig. 2 where a fifth coil spring 40 is shown at the center of the coil spring cluster.

The bolster 29 is also supported by a pair of semi-elliptic springs 41 of the leaf type which are disposed generally on opposite sides of the bolster opening 27 and are aligned lengthwise of the side frame and each of whose center bands 42 rest on a spring seat 43 formed on one of the diagonal tension webs 23. The inner end of each spring 41 extends through an aperture 44 in a bolster column into the opening 27 between the inner and outer pairs of coil springs and engages a spring seat 45 depending from the lower web 33 of the bolster. An alternative spring seat construction is illustrated in Fig. 4 where the seat is formed by the enlarged head of a pin 46 which extends through the web 33. Each leaf spring is anchored against endwise movement by a pin 47 which is bridged between the frame side walls 24 and extends through an eye on the outer end of the top leaf of the associated spring. To facilitate insertion and removal of the leaf springs 41, an opening 48 is provided in the compression web on each side of the bolster opening. The springs are removed endwise through these openings.

Under operating conditions, the springs 31 and 41 act in unison and in parallel, load transfer relation to transmit loads to the side frame. Owing to the work absorptive nature of the springs 41, their natural period of vibration is different from the coil springs 31 so a mutual dampening action is set up which inhibits any tendency towards synchronous vibration. The leaf springs are characterized by substantially a cantilever action since only the inner ends are loaded.

The distribution of the springs provides for a stable cooperation of the bolster and side frames and avoids areas of critical loading on these parts and hence enables the use of simple structural shapes and sections with corresponding lightness of weight. In this connection, it should be noted that the diagonal tension members 17 act as spring load carrying parts in addition to their usual load transmitting function with respect to that portion of the bolster load which is applied to the spring seat 22. The leaf springs may be removed for any purpose simply by raising the bolster, withdrawing the pins 47 and then lifting the springs through the openings 48. In general, all of the foregoing features have been combined so that the truck is characterized by good riding qualities, capacity for high speed service and easy assembly and replacement of the several parts of the truck.

In Fig. 6 is illustrated a modified structure which differs from that described above in that the side frame 49 is provided with an upper bolster opening 50, as distinguished from the lower opening 27 shown in Fig. 1. Below the opening 50, the frame includes bolster guides 51 between which operates one end of a bolster 52 whose outer guide lugs 53 are shorter than the inner lugs 54. With this construction, it is possible to assemble the springs on the side frame before connecting the bolster, or by simply jacking up the bolster to disconnect the frame for wheel replacement without disturbing the spring assembly.

I claim:

1. In a truck, the combination of a side frame having a spring seat, a bolster operatively related to the frame, and a spring assembly comprising coil springs between the bolster and spring seat and a pair of leaf springs, the leaf springs being respectively intermediately supported on the frame on opposite sides of and beyond the spring seat with one end loaded by the bolster and the other end anchored to the frame.

2. In a truck, the combination of a side frame having a spring seat, a bolster operatively related to the frame, and a spring assembly comprising coil springs between the bolster and spring seat and a pair of leaf springs aligned lengthwise of the frame, the leaf springs being respectively intermediately supported on the frame on opposite sides of the spring seat with one end loaded by the bolster and the other end anchored to the frame.

3. In a truck, the combination of a side frame having a window opening and a spring seat, a bolster operatively received within the opening, and a spring assembly comprising coil springs between the bolster and spring seat and plate springs each having a part loaded by the bolster within the window opening and another part anchored to the frame and the plate springs being respectively intermediately supported on the frame on opposite sides of and beyond the spring seat.

4. In a truck, the combination of a side frame having a window opening and a spring seat, a bolster operatively received within the opening, and a spring assembly comprising coil springs between the bolster and spring seat and a pair of leaf springs aligned lengthwise of the frame, each leaf spring having an end loaded by the bolster within the window opening and the leaf springs being respectively supported by the frame on opposite sides of the spring seat.

5. In a truck, the combination of a side frame having a spring seat, a bolster operatively related to the frame, and a spring assembly comprising a central cluster of coil springs between the bolster and spring seat and a pair of leaf springs extending in opposite directions from the cluster, the adjacent ends of the leaf springs being loaded by the bolster and the leaf springs being respectively supported on the frame on opposite sides of the spring seat.

6. In a truck, the combination of a side frame having a spring seat, a bolster operatively related to the frame, and a spring assembly comprising a central cluster of coil springs between the bolster and spring seat and a pair of leaf springs aligned lengthwise of the frame and extending in opposite directions from the cluster, the adjacent ends of the leaf springs being loaded by the bolster and the leaf springs being respectively supported on the frame on opposite sides of the spring seat.

7. In a truck, the combination of a side frame, having a spring seat, a bolster operatively related to the frame, and a spring assembly comprising a central cluster of coil springs between the bolster and spring seat and arranged in inner and outer groups and a pair of leaf springs aligned lengthwise of the frame and extending in opposite directions from the cluster, the adjacent ends of the leaf springs extending between the groups and being loaded by the bolster and the leaf springs being respectively supported on the frame on opposite sides of the spring seat.

8. In a truck, the combination of a truss side frame having a spring seat and diagonal tension members extending oppositely therefrom, a bolster operatively related to the frame, and a spring suspension comprising coil springs between the bolster and spring seat and a pair of leaf springs, each leaf spring being intermediately supported on a member with one end loaded by the bolster and the other end anchored to the frame.

9. In a truck, the combination of a truss side frame having a spring seat and diagonal tension members extending oppositely therefrom, a bolster operatively related to the frame, and a spring suspension comprising coil springs between the bolster and spring seat and a pair of leaf springs aligned lengthwise of the frame, each leaf spring being supported on a member with one end loaded by the bolster.

10. In a truck, the combination of a side frame having a window opening, a spring seat and diagonal tension members extending oppositely therefrom, a bolster operatively received within the opening, and a spring suspension comprising coil springs between the bolster and spring seat and a pair of leaf springs, each leaf spring being supported by a member with one end loaded by the bolster within the opening.

11. In a truck, the combination of a side frame having a window opening, a spring seat and diagonal tension members extending oppositely therefrom, a bolster operatively received within the opening, and a spring suspension comprising coil springs between the bolster and spring seat and a pair of leaf springs, each leaf spring being intermediately supported on a member with one end loaded by the bolster within the opening and the other end anchored to the frame.

12. In a truck, the combination of a side frame having a window opening, a spring seat and diagonal tension members extending oppositely therefrom, a bolster operatively received within the opening, and a spring suspension comprising coil springs between the bolster and spring seat and a pair of leaf springs aligned lengthwise of the frame, each leaf spring being supported on a member with one end loaded by the bolster within the opening.

13. In a truck, the combination of a truss side frame having a spring seat and diagonal tension members extending oppositely therefrom, a bolster operatively related to the frame, a spring suspension comprising coil springs between the bolster and spring seat and a pair of leaf springs, each leaf spring being intermediately supported on a member with one end loaded by the bolster, and means for anchoring the opposite end of each leaf spring.

14. In a truck, the combination of a truss side frame having a spring seat and diagonal tension members extending oppositely therefrom, a bolster operatively related to the frame, a spring suspension comprising coil springs between the bolster and spring seat and a pair of leaf springs, each leaf spring being supported on a member with one end loaded by the bolster, and means securing the opposite end to the frame.

15. In a truck, the combination of a truss side frame having a spring seat and diagonal tension members extending oppositely therefrom, a bolster operatively related to the frame, a spring suspension comprising coil springs between the bolster and spring seat and a pair of leaf springs, each leaf spring being supported on a member with one end loaded by the bolster and the opposite end of one leaf being formed as an eye, and a pin extending through the eye and secured to the frame.

16. In a truck, the combination of a side frame having a spring seat, a bolster operatively related to the frame and having spring seats depending from the under side thereof, and a spring assembly comprising coil springs between the bolster and frame spring seat and leaf springs, the leaf springs being intermediately supported on the frame on opposite sides of and beyond the frame spring seat with one end bearing on a bolster spring seat and the other end anchored to the frame.

17. In a truck, the combination of a side frame having a spring seat, a hollow bolster operatively related to the frame, pins extending through the bottom wall of the bolster and having their lower ends enlarged to form spring seats, and a spring assembly comprising coil springs between the bolster and frame spring seat and leaf springs, each leaf spring being supported on the frame externally of the frame spring seat with one end bearing on a pin spring seat.

18. In a truck, the combination of a cast side frame, having a compression member, a tension member provided with a spring seat and bolster columns extending between the members and defining a window opening, the top and bottom webs of the compression and tension members, respectively, beyond the columns being connected by spaced side walls, a bolster operatively received within the opening, and a spring suspension comprising coil springs between the bolster and spring seat and a pair of semi-elliptic springs extending lengthwise of the frame in opposite directions from the window opening, each of the latter springs being supported on the frame between the walls with one end loaded by the bolster within the window opening, the compression web including an opening beyond each column through which the associated semi-elliptic spring is mounted within and removed from the side frame.

19. In a truck, the combination of a cast, truss side frame having a compression member, a tension member provided with a spring seat and diagonal tension portions extending therefrom and bolster columns extending between the members and defining a window opening, the top and bottom webs of the compression and tension members, respectively, beyond the columns being connected by spaced side walls, a bolster operatively received within the opening, and a spring suspension comprising coil springs between the bolster and spring seat and a pair of semi-elliptic springs extending lengthwise of the frame in opposite directions from the window opening, each leaf spring being supported on a diagonal tension portion with one end loaded by the bolster within the window opening, the compression web including an opening beyond each column through which the associated semi-elliptic spring is mounted within and removed from the side frame.

20. In a truck, the combination of an integral, truss side frame having a spring seat, diagonal tension members extending oppositely therefrom and journal boxes, a bolster operatively related to the frame, a spring suspension comprising coil springs between the bolster and spring seat and a pair of leaf springs, each leaf spring being supported on a member with one end loaded by the bolster, and means located adjacent the journal boxes for preventing endwise movement of the leaf springs.

21. A cast truss side frame comprising a compression member having a top web, a tension member including diagonal tension portions each having a bottom web, spaced bolster columns extending between the members to form a window opening, spaced walls connecting the webs outwardly of the columns, and a leaf spring seat on each tension web for a leaf spring arranged to extend into the opening, the columns being apertured to receive the springs and the compression web being apertured outwardly of the columns to facilitate insertion and removal of the springs.

22. A side frame comprising a compression member, a tension member including diagonal tension portions, spaced bolster columns extending between the members to form a window opening, and a leaf spring seat on each portion for a leaf spring arranged to extend into the opening, the columns being apertured to receive the springs, and means on the frame adapted to anchor one end of each spring.

23. In a truck, the combination of a side frame comprising a compression member, a tension member including diagonal tension portions, spaced bolster columns extending between the members to form a window opening, and a leaf spring intermediately seated on each portion with one end extending into the opening for loading by the bolster and the other end anchored to the frame.

24. In a truck, the combination of a side frame comprising a compression member, a tension member including diagonal tension portions, and spaced bolster columns extending between the members to form a window opening, a leaf spring intermediately seated on each portion with one end loaded by the bolster within the window opening, and means for anchoring the opposite end of each spring to the frame.

25. In a truck, the combination of a side frame having a spring seat, a bolster operatively related to the frame, and a spring assembly comprising coil springs between the bolster and spring seat and a pair of cantilever leaf springs loaded by the bolster and respectively intermediately supported on the frame on opposite sides of the spring seat, the unloaded end of each leaf spring being anchored to the frame.

26. In a truck, the combination of a side frame having a spring seat and diagonal tension members extending oppositely therefrom, a bolster operatively related to the frame, and a spring assembly comprising coil springs between the bolster and spring seat and a pair of cantilever leaf springs, each leaf spring being intermediately supported on a member with one end loaded by the bolster and the other end anchored to the frame.

27. In a truck, the combination of a side frame having a compression member, a tension member, spaced bolster columns extending between the members to form a window opening, and a spring seat on the tension member between the columns, and a spring assembly comprising coil springs between the bolster and spring seat and plate springs loaded by the bolster and intermediately supported on the tension member on opposite sides of the window opening and beyond the columns.

28. In a truck, the combination of a side frame having a compression member, a tension member, spaced bolster columns extending between the members to form a window opening, and a spring seat on the tension member between the columns, and a spring assembly comprising coil springs between the bolster and spring seat and plate springs loaded by the bolster and intermediately supported on the tension member on opposite sides of the window opening and beyond the columns, the coil and plate springs being arranged in parallel, load transfer relation.

29. In a truck, the combination of a side frame having a compression member, a tension member, spaced bolster columns extending between the members to form a window opening, and a spring seat on the tension member between the columns, and a spring assembly comprising coil springs between the bolster and spring seat and plate springs each having an end loaded by the bolster within the window opening and respectively supported on the tension member on opposite sides of the window opening and beyond the columns.

MARK H. MARTIN.